Aug. 6, 1929.　　　F. J. MUELLER　　　1,723,950
FILM HANDLING APPARATUS
Filed Aug. 24, 1927
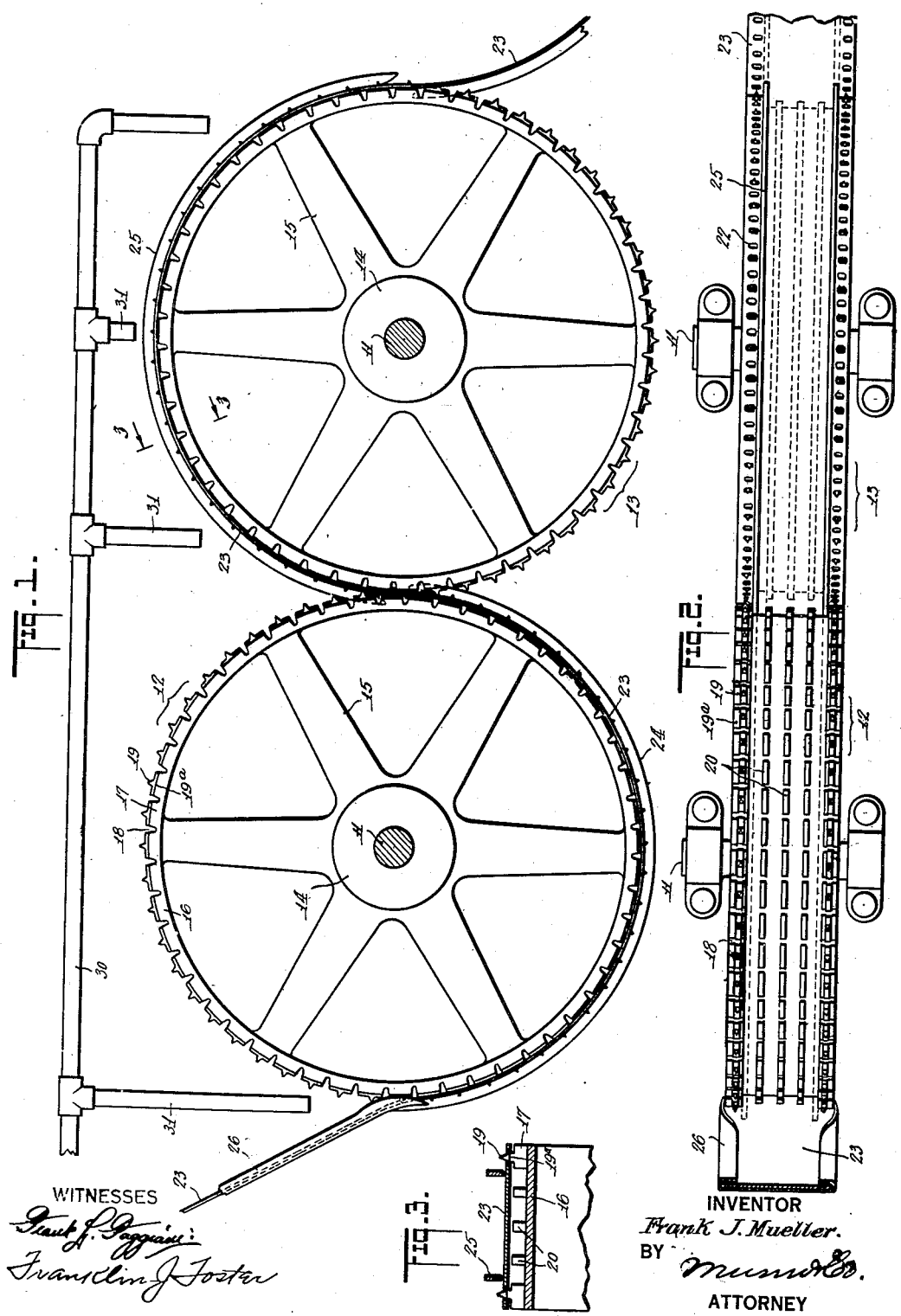
INVENTOR
Frank J. Mueller.
BY
ATTORNEY Patented Aug. 6, 1929.

1,723,950

UNITED STATES PATENT OFFICE.

FRANK J. MUELLER, OF EDGEWATER, NEW JERSEY.

FILM-HANDLING APPARATUS.

Application filed August 24, 1927. Serial No. 215,174.

The present invention is concerned with the provision of apparatus for handling strips of motion picture film, particularly with an apparatus which is capable of efficiently handling the film when the latter is in a wet soggy condition.

Film of this type, when thoroughly wet, especially when coming directly from the development tanks, is in an extremely soft slippery condition, and cannot be successfully handled by friction rollers of any kind. It is highly desirable however, to expeditiously handle film in this condition without its being passed through washing devices, through drying chambers, etc. In accordance with the present invention I provide a film handling apparatus in which the film is positively shifted by a pair of intermeshing sprocket wheels of a peculiar formation, assisted preferably by the use of guide members which cause a positive transfer of the film from the periphery of one wheel to the periphery of an adjacent one.

Objects of the invention are to provide an apparatus of this character, which will be extremely positive in action, simple and practical in construction, rugged and durable in use, well suited to the requirements of economical manufacture, and capable of handling films, especially wet films, wherever such handling may be necessary, or wherever it is desired to transfer the films through a bath or treating chamber of any character.

With the above noted and other objects in view, the invention consists in certain novel features of construction and combinations and arrangements of parts, as will be more fully hereinafter set forth and pointed out in the claims. The invention may be more fully understood from the following description in connection with the accompanying drawings, wherein—

Fig. 1 is a somewhat digrammatic side elevational view showing an apparatus embodying the present invention.

Fig. 2 is a top plan view of Fig. 1.

Fig. 3 is a transvere sectional detail on the line 3—3 of Fig. 2.

The apparatus of the present invention includes any suitable number of intermeshing sprocket wheels mounted upon shafts 11 and driven in any convenient or conventional manner. For the sake of simplifying the showing of the apparatus, I have illustrated only two intermeshing sprocket wheels designated generally at 12 and 13, but it is to be understood that any suitable number of wheels may be arranged in intermeshing relationship and any suitable number of batteries of wheels mounted on the same shafts for passing a plurality of lengths of film through a tank or treating chamber at the same time. Each of the sprocket wheels includes a hub 14, spokes 15, and a solid rim 16. The peripheral faces of the wheel rims adjacent each lateral edge thereof, are formed with series of stepped teeth 17 defining notches 18 between them, the stepped teeth preferably including pointed driving extensions 19 at their intermediate portions. With the two wheels in mesh, the extensions 19 of one wheel engage the notches 18 of the other, and provide a continuous drive.

Preferably, the teeth 17 are shouldered as at 19$^a$, these shoulders being arranged approximately at the level of circumferential parallel rows of lugs 20, which lugs cooperatively define inter-communicating water-circulating channels, so that the film may be thoroughly washed as it is passing over the sprocket wheels 12, 13.

The teeth extensions 19 are spaced apart a distance equal to the distance between two perforations 22 of the film 23, so that at the point where the two wheels are in mesh, the teeth of the wheel 13 for instance, will enter perforations of the film which are not engaged with the teeth of the wheel 12, and the film will be transferred from one wheel to the other.

In order that this transfer may be rendered positive, I employ guides, such as 24, 25 with the wheels 12 and 13. These guides arranged closely adjacent the peripheries of the wheels and supported in any convenient or conventional manner (not shown) prevent the film from becoming disengaged with the wheels as the film passes the lower sides thereof, and also assure positive transfer from one wheel to another. As clearly indicated in Fig. 1, the film 23 is delivered down a chute 26 into the left hand end of the guide 24, where alternate perforations of the film are engaged by the teeth extensions 19. The guide 24 maintains the film in engagement with the teeth as it passes around the lower side of wheel 12. As the film end reaches the point of intermeshing engagement of the two sprocket wheels, the end of the guide 25 directs it from one wheel to the other, preventing the film from sticking to the teeth of the wheel 12, and maintaining the film in proper engagement with the teeth of the wheel 13.

As suggested above, this particular type of sprocket wheel may have a wide range of utility, wherever films are to be handled and passed through treating chambers of any type. The use of the intercommunicating, water-circulating channels on the peripheries of the wheels however, renders them peculiarly efficient for handling wet sticky film and treating it while it is being carried from one point to another. I have illustrated rather diagrammatically a supply pipe 30 and a number of depending discharge pipes 31 for delivering water on to the surface of the sprocket wheels in such a manner that it will reach both sides of the film and thoroughly wash the same in the course of its travel over the sprocket wheels.

Obviously, various changes and alterations might be made in the general form and arrangement of the parts described without departing from the invention. Hence I do not wish to limit myself to the details set forth, but shall consider myself at liberty to make such changes and alterations as fairly fall within the spirit and scope of the appended claims.

I claim:

1. A film handling apparatus including a pair of intermeshing wheels, each wheel including parallel peripheral rows of alternate sprocket teeth and notches, the teeth of one wheel meshing in the notches of the other, and the adjacent teeth of each wheel being spaced apart a distance equal to the distance between two non-adjacent perforations in a film strip to be handled.

2. A film handling apparatus including a pair of intermeshing wheels, each wheel including parallel peripheral rows of alternate sprocket teeth and notches, the teeth of one wheel meshing in the notches of the other, and the adjacent teeth of each wheel being spaced apart a distance equal to the distance between two non-adjacent perforations in a film strip to be handled, and guide means arranged closely adjacent the peripheries of the wheels and between the rows of teeth to retain the film strip on the teeth.

3. A film handling apparatus including a pair of intermeshing wheels, each wheel including parallel peripheral rows of alternate sprocket teeth and notches, the teeth of one wheel meshing in the notches of the other, and the adjacent teeth of each wheel being spaced apart a distance equal to the distance between two non-adjacent perforations in a film strip to be handled, and guide means arranged closely adjacent the peripheries of the wheels and between the rows of teeth to retain the film strip on the teeth, the guide strip of each wheel including an end accommodated in a groove in the peripheral surface of the other wheel, whereby to render positive the transfer of the strip from one wheel to another at the point where the wheels intermesh.

4. A film handling apparatus including a pair of intermeshing wheels, each wheel including parallel peripheral rows of alternate sprocket teeth and notches, the teeth of one wheel meshing in the notches of the other, and the adjacent teeth of each wheel being spaced apart a distance equal to the distance between two non-adjacent perforations in a film strip to be handled, the teeth projecting from raised shoulders on which the film strip rides.

5. A film handling apparatus including a pair of intermeshing wheels, each wheel including parallel peripheral rows of alternate sprocket teeth and notches, the teeth of one wheel meshing in the notches of the other, and the adjacent teeth of each wheel being spaced apart a distance equal to the distance between two non-adjacent perforations in a film strip to be handled, the wheel including parallel rows of peripheral lugs defining inter-communicating water channels in the film-bearing faces of the wheels.

6. A film handling apparatus including a pair of intermeshing wheels, each wheel including parallel peripheral rows of alternate sprocket teeth and notches, the teeth of one wheel meshing in the notches of the other, and the adjacent teeth of each wheel being spaced apart a distance equal to the distance between two non-adjacent perforations in a film strip to be handled, the wheel including parallel rows of peripheral lugs defining inter-communicating water channels in the film-bearing faces of the wheels, and means for delivering water into said channels.

Signed at New York in the county of New York and State of New York this 23rd day of August, 1927.

FRANK J. MUELLER.